US012327798B2

(12) United States Patent
Cheng et al.

(10) Patent No.: US 12,327,798 B2
(45) Date of Patent: Jun. 10, 2025

(54) PHYSICAL UNCLONABLE FUNCTION

(71) Applicant: INTERNATIONAL BUSINESS MACHINES CORPORATION, Armonk, NY (US)

(72) Inventors: Kangguo Cheng, Schenectady, NY (US); Eric Miller, Watervliet, NY (US); Fee Li Lie, Albany, NY (US); Gauri Karve, Cohoes, NY (US); Marc A. Bergendahl, Rensselaer, NY (US); John Ryan Sporre, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/844,608

(22) Filed: Apr. 9, 2020

(65) Prior Publication Data
US 2021/0320070 A1   Oct. 14, 2021

(51) Int. Cl.
*H01L 23/544* (2006.01)
*G06F 21/75* (2013.01)
(Continued)

(52) U.S. Cl.
CPC ........... *H01L 23/544* (2013.01); *G06F 21/75* (2013.01); *H10D 84/0142* (2025.01); *H10D 84/0158* (2025.01); *H10D 84/038* (2025.01); *H10D 84/834* (2025.01); *H01L 2223/54413* (2013.01); *H01L 2223/5444* (2013.01)

(58) Field of Classification Search
None
See application file for complete search history.

(56) References Cited

U.S. PATENT DOCUMENTS 7,941,673 B1 * 5/2011 Trimberger ........... H04L 9/0866
380/37
8,759,976 B2   6/2014 Edelstein et al.
(Continued)

FOREIGN PATENT DOCUMENTS

WO   WO-2016058793 A1 *  4/2016  ............... G09C 1/00
WO   WO-2018199541 A1 * 11/2018  ............. G06F 21/64

OTHER PUBLICATIONS

"Semiconductors & The World Trade Organization" (Year: 2020).*
(Continued)

*Primary Examiner* — Evren Seven
(74) *Attorney, Agent, or Firm* — Tutunjian & Bitetto, P.C.; Robert Richard Aragona (57) ABSTRACT

Methods, and devices related to authentication of chips using physical unclonable function (PUF) are disclosed. The semiconductor chip has a substrate having a major surface. The semiconductor chip has a boundary defined on the major surface in accordance with a ground rule associated with a gate cut passing (CT) fin formed on the major surface. The semiconductor chip has multiple non-planar devices fabricated on the surface at the boundary. The CT fin forms a random distribution of field effect transistors (FETs) with varying work function metal (WFM) thickness that includes some FETs that fail the ground rule and other FETs that meet the ground rule. A physical unclonable function (PUF) region is defined in accordance with the random distribution.

15 Claims, 8 Drawing Sheets

(51) Int. Cl.
*H10D 84/01* (2025.01)
*H10D 84/03* (2025.01)
*H10D 84/83* (2025.01)

(56) References Cited

U.S. PATENT DOCUMENTS

| | | | |
|---|---|---|---|
| 9,117,824 B2 | 8/2015 | Feng et al. | |
| 9,189,654 B2 | 11/2015 | Feng et al. | |
| 9,576,914 B2 | 2/2017 | Li et al. | |
| 9,666,582 B1 | 5/2017 | Li et al. | |
| 10,134,762 B2 | 11/2018 | Cheng et al. | |
| 2006/0210082 A1* | 9/2006 | Devadas | G11C 7/24 380/277 |
| 2011/0317829 A1* | 12/2011 | Ficke | H04L 9/3278 380/46 |
| 2014/0042628 A1 | 2/2014 | Edelstein et al. | |
| 2015/0200260 A1* | 7/2015 | Yu | H01L 29/495 438/507 |
| 2015/0340461 A1* | 11/2015 | Wei | H01L 29/49 257/412 |
| 2016/0056181 A1* | 2/2016 | Anderson | H01L 21/823481 438/157 |
| 2016/0133632 A1* | 5/2016 | Park | H01L 21/02164 257/369 |
| 2016/0300948 A1* | 10/2016 | Yang | H01L 27/0924 |
| 2017/0194356 A1 | 7/2017 | Cheng et al. | |
| 2018/0277198 A1 | 9/2018 | Tseng et al. | |
| 2019/0147948 A1 | 5/2019 | Cheng | |
| 2021/0108908 A1* | 4/2021 | Leobandung | G03F 7/70633 |
| 2021/0175185 A1* | 6/2021 | Kozicki | G09C 1/00 |

OTHER PUBLICATIONS

"Design Rule Complexity Rising" by Sperling (Year: 2018).*
"Fifty Years of Moore's Law" by Mack (Year: 2011).*
Faragalla et al., "Impact of Process Variability on FinFET 6T SRAM Cells for Physical Unclonable Functions (PUFs)", 12th International Conference on Computer Engineering and Systems (ICCES 2017). Dec. 19, 2017. pp. 31-36.

* cited by examiner

PHYSICAL UNCLONABLE FUNCTION

BACKGROUND

The present invention generally relates to physical unclonable functions, and more particularly, to on-chip physical unclonable function generation and management thereof.

In the electronics industry, security in electronic devices has become a major concern of manufacturers and users of such devices. In this regard, it is useful to be able to distinguish each electronic device, especially the integrated circuit (IC) within these devices, from each other. This is particularly true for devices such as computers, personal hand held devices, cellular phones, chip cards, and other devices that contain sensitive information.

Physical unclonable function (PUF) is an emerging hardware-based security that has a variety of applications. For example, PUFs can be used to uniquely identify a piece of hardware by providing a unique identifying signal that is difficult to counterfeit. PUFs are unique and generate a highly reproducible output, even with a fuzzy readout.

SUMMARY

In accordance with an embodiment of the present invention, a semiconductor chip has a substrate having a major surface. The semiconductor chip has a boundary defined on the major surface in accordance with a ground rule associated with a gate cut passing (CT) fin formed on the major surface. The semiconductor chip has multiple non-planar devices fabricated on the surface at the boundary. The CT fin forms a random distribution of field effect transistors (FETs) with varying work function metal (WFM) thickness that includes some FETs that fail the ground rule and other FETs that meet the ground rule. A physical unclonable function (PUF) region is defined in accordance with the random distribution.

In accordance with an embodiment of the present invention, an array of transistors include a substrate having a major surface. The array of transistors a boundary defined on the major surface in accordance with a ground rule associated with a gate cut passing (CT) fin formed on the major surface. The transistors are fabricated on the surface at the boundary. The CT fin forms a random distribution of field effect transistors (FETs) with varying work function metal (WFM) thickness that includes some that fail the ground rule and FETs that meet the ground rule. A physical unclonable function (PUF) region is defined in accordance with the random distribution.

In accordance with an embodiment of the present invention, a method of forming a semiconductor structure with a physical unclonable function (PUF) is provided. The method includes forming multiple fins over a semiconductor layer formed over a substrate. The method includes performing dummy gate cut and fill for a dummy gate at a borderline of a ground rule for gate cut (CT). The method includes removing the dummy gate. The method also includes depositing a high-k dielectric layer and metal gate. The CT results in a random distribution of field-effect transistor (FETs) with variation of gate work function on fin channel sidewalls that fail the ground rule and FETs that meet the ground rule. The array results in a random and unique PUF for each chip.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention relate generally to a method and structure for forming a chip with a physical unclonable function (PUF) by implementing (for example, via sub-lithography) a manufacturing process for non-planar transistors. The process is applicable to the gate wrap around for channels in three dimensional structures, such as fin field-effect transistors (FinFETs), nanowire transistors, circular gate transistors, oval transistors, etc. The PUF can be determined in the chips in accordance with ground rule for a gate cut (CT) in relation to a minimum critical work function metal (WFM) thickness of each non-planar transistor. For example, in a FinFET the CT is determined in relation to the fin edge. In other words, in this instance, the CT has to be placed away from fin edge with a minimal distance (for example, distance x).

In accordance with embodiments of the invention, for PUF transistors on the same chip, the CT is intentionally designed at the clip (for example, a transition point, a culminating point, a minimum, etc.) of a ground rule for providing consistent FinFET performance. Due to inherent process variation in patterning (lithography/etch), a spacing between CT and a fin edge that is cut at the clip of the ground rule may be greater or less than a critical WFM thickness. The transistor with CT-fin spacing greater than the critical WFM thickness behaves substantially the same as the regular FinFET, (logic "0"). In contrast, the transistor with CT-fin spacing less than a critical WFM thickness behaves different from the regular FinFET, exhibiting higher threshold voltage (Vt) and lower drive current (logic "1"). An array of transistors with a 'borderline' design produces a random, unique PUF for each chip.

The example embodiments achieve physically unclonable electrical structures using sub ground rule gate cut mask placement to create varying (for example, modulated, measurable, etc.) current levels in a transistor structure.

Exemplary applications/uses to which the present invention can be applied include, but are not limited to chip security for a variety of applications such as Internet-of-Things (IoT). The example embodiments provide a security feature on chip without adding process cost that can be implemented for a wide variety of electronics, from supercomputers to IoT.

Figure 1:
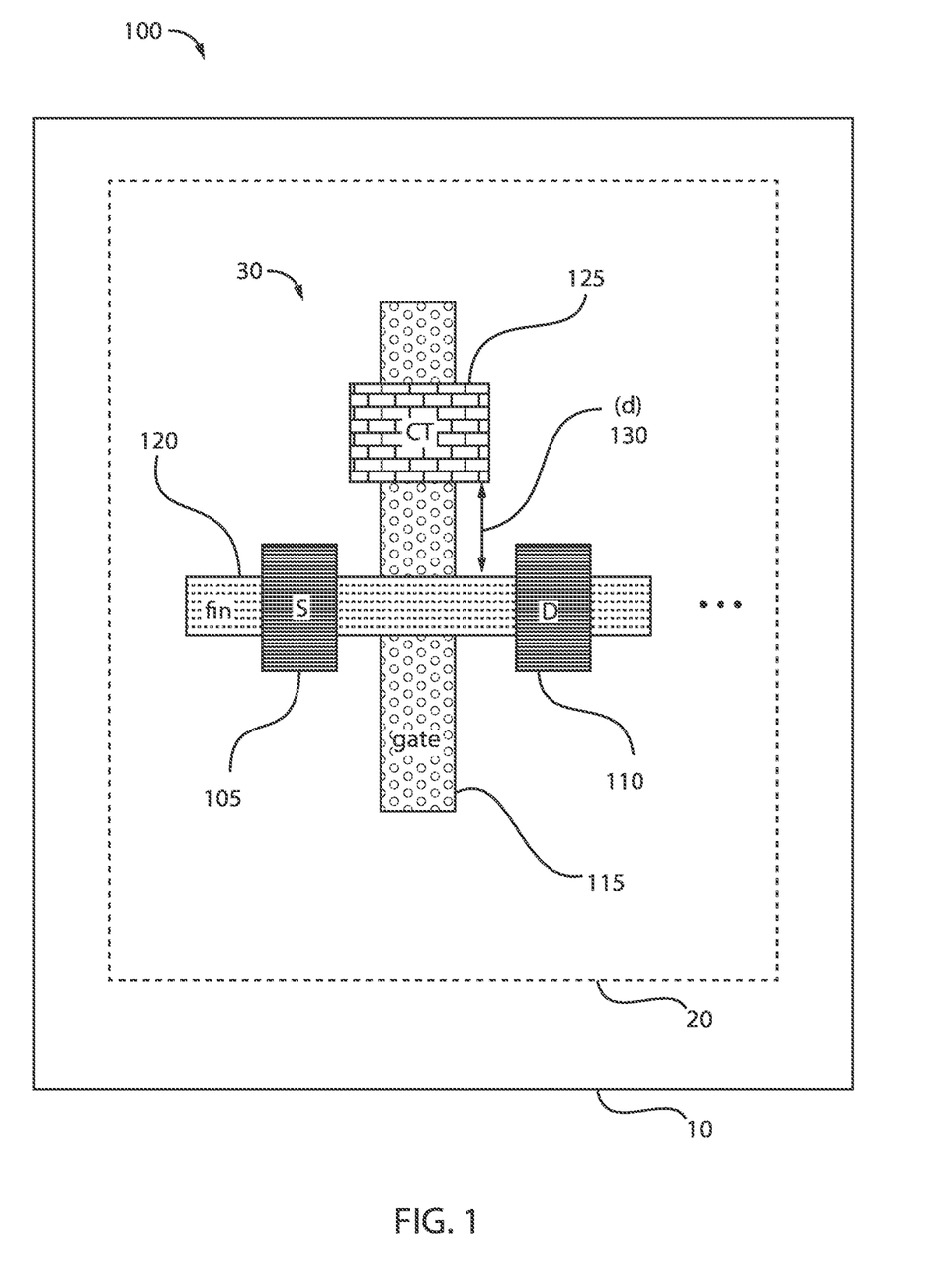
FIG. 1 is a cross-sectional view showing borderline gate cut (CT) fin spacing, in accordance with an embodiment of the present invention.

Referring now to the drawings in which like numerals represent the same or similar elements and initially to FIG. 1, a cross-sectional view 100 showing a borderline gate cut (CT) fin spacing is illustrated in accordance with example embodiments.

As shown in FIG. 1, a semiconductor chip 10, which can include an integrated circuit (IC) within devices such as a memory device, a processor, cellular phones, chip cards, and other devices that have sensitive information etc., includes a PUF area 20 with FinFETs 30. Although a single FinFET 30 is shown for clarity of illustration, it should be understood that the PUF area 20 can include multiple FinFETs, for example, arranged in an array (as will be described with respect to FIG. 7 herein below) or any order from which a PUF signal can be generated. For each FinFET 30, a gate 115 intersects with a fin 120. The example embodiments implement a PUF with a borderline CT 125 passing fin 120 design (CT-fin spacing). The PUF can be determined in the chips in accordance with ground rule for a CT 125 in relation to the fin edge of each FinFET 30. The CT is placed away from fin edge with at least a minimal distance (for example, a minimal distance d0) 130. Non-limiting values of d0 can include, for example, a range from 5-10 nm, depending on transistor types and technology requirements.

A ground rule requirement as described herein ensures that when a gate cut is applied during fabrication of a device, there is sufficient margin of material to ensure the device performs as a regular device. Application of the ground rule requirement for standard CMOS transistors gate cut (CT) passing fin results in the devices meeting the ground rule, meaning that CT has been placed away from fin edge with a minimal distance of x. Such a ground rule requirement ensures that when the dummy gate is removed and high-k gate dielectric and work function metal (WFM) is deposited, there is enough spacing between CT and fin to ensure WFM on fin sidewalls equal to or greater than a critical WFM thickness. Otherwise, for example in instances when the gate cut does not meet the ground rule, thinner WFM will result in Vt variation (Vt going up) and transistor performance degrades.

The FinFET 30 includes a source (S) 105 and drain (D) 110 arrayed on the fin 120. The gate 115 cut (CT) 125 in the example embodiments is determined in the chips in accordance with ground rule for a CT 125 in relation to the fin 120 edge of each FinFET. In particular, process variation in patterning (lithography/etching) produces the PUF. Spacing between CT 125 and fin edge may be greater or less than the critical work function metal (WFM) thickness.

As used herein, the term "source", for example source (S) 105, is a doped region in the semiconductor device, in which electrical carriers (for example, electrons or holes) are flowing into the channel. As used herein, the term "drain", for example drain (D) 110, means a doped region in semiconductor device located at the end of the channel, in which carriers are flowing out of the transistor through the drain. The "channel" is the region of the underlying the gate structure and between the source 105 and drain 110 of a semiconductor device that becomes conductive when the semiconductor device is turned on. In example embodiments, to provide source 105 and drain 110 region structures, the epitaxial material can be doped to an n-type or p-type conductivity.

As used herein, "semiconductor device" refers to an electronic device that includes a semiconductor material. A field effect transistor (FET) is a semiconductor device in which output current, e.g., source-drain current, is controlled by the voltage applied to a gate structure to the semiconductor device. A field effect transistor can have three terminals, e.g., gate structure, source region and drain region. A finFET is a semiconductor device that positions the channel region of the semiconductor device in a fin structure. A FinFET is a multiple-gate device, for example, a MOSFET (metal-oxide-semiconductor field-effect transistor), built on a substrate where the gate 115 is placed on two, three, or four sides of the channel or wrapped around the channel, forming a double gate structure. The source 105/drain 110 region forms fins on the surface. As used herein, a "fin structure", for example fin 120, refers to a semiconductor material, which is employed as the body of a semiconductor device, in which the gate structure is positioned around the fin structure such that charge flows along the channel on the two sidewalls of the fin structure and optionally along the top surface of the fin structure.

The example embodiments provide a method and structure for forming PUF on a chip along with (or during) a FinFET process. The processes described herein can be implemented with complementary metal oxide (CMOS) transistors. Although the example embodiments are described with respect to FinFETs, it should be understood that the principles, methods and structures described herein are applicable to any non-planar transistor.

Figure 2:
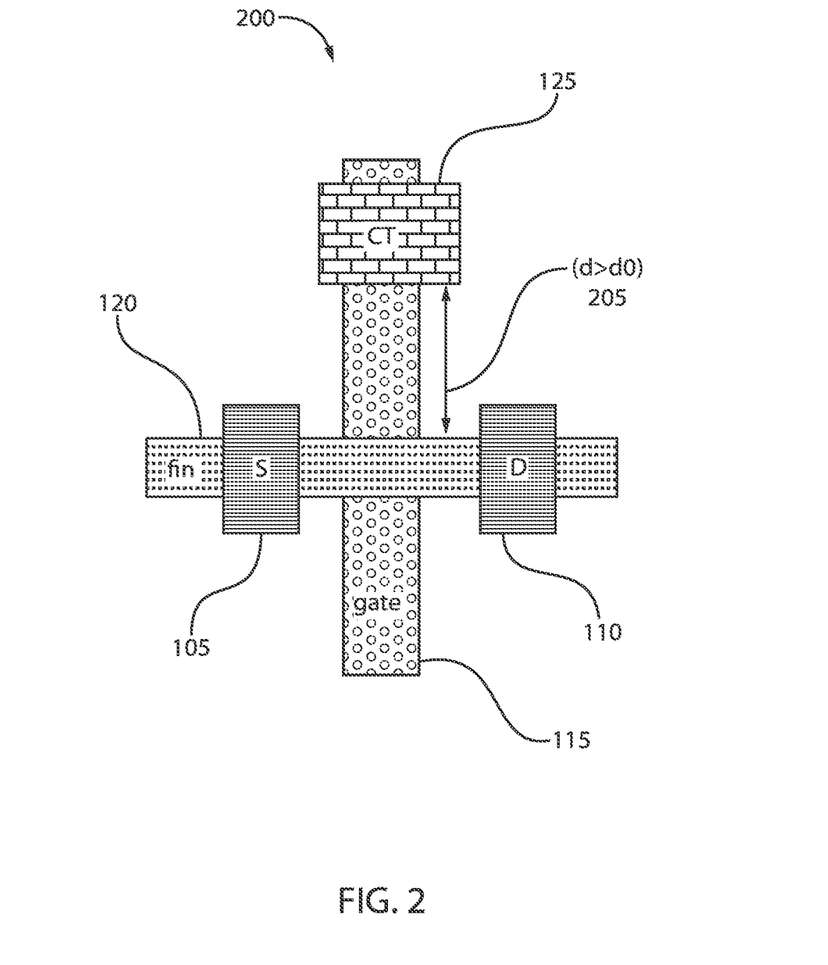
FIG. 2 is a cross-sectional view showing a CT-fin that meets a logic ground-rule, in accordance with an embodiment of the present invention.
Figure 3:
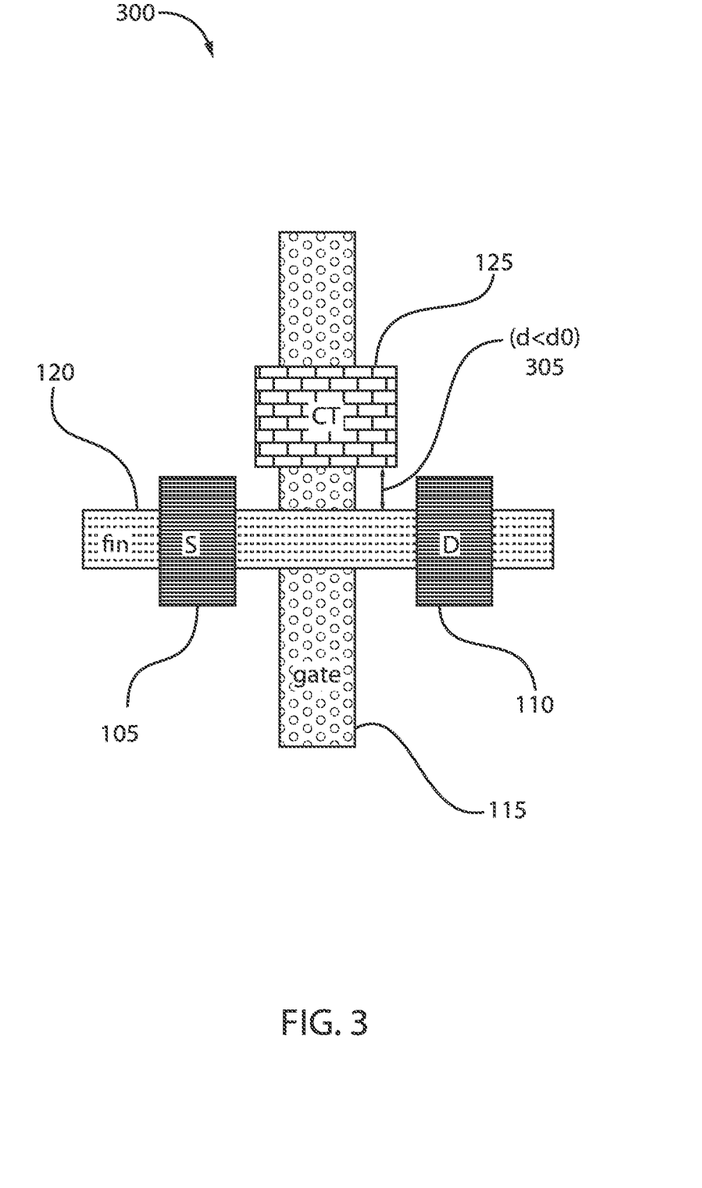
FIG. 3 is a cross-sectional view showing a CT-fin that fails the logic ground-rule, in accordance with an embodiment of the present invention.

FIGS. 2 and 3 illustrate two possible results of a gate cut at the borderline of the ground rule based on process variation in patterning (lithography/etching) that produces the PUF. When multiple devices are formed in an array, such as described below with respect to FIG. 7, the devices are formed in a manner where the random variance of patterning results in each device meeting (FIG. 2) or not meeting (FIG. 3) the ground rule.

For standard complementary metal oxide (CMOS) transistors, gate cut (CT) passing fin meets the ground rule, meaning the CT has to be placed away from fin edge with a minimal distance (for example "x"). The ground rule requirement ensures that when a dummy gate (a sacrificial gate) is removed during fabrication of the devices, such as described further herein below with respect to FIG. 8, and high-k gate dielectric and work function metal (WFM) is deposited, there is enough spacing between CT and fin to ensure WFM on fin sidewalls equal to or greater than a critical WFM thickness. Otherwise, thinner WFM will result in Vt (threshold voltage) variation (for example, Vt going up) and transistor performance degrades.

In accordance with example embodiments, for PUF transistors on the same chip, the CT 125 is intentionally designed at a minimum margin (for example, at a clip, borderline, edge, transition point, culminating point, within an approximate plus/minus maximum distance, etc.) of the ground rule. The borderline CT-fin spacing in these instances is less than regular design (in other words, a minimal distance from the fin edge is not maintained). The borderline can include a distance at which the PUF transistors minimally meet the ground rule. Devices that meet the ground rule have enough WFM thickness to perform as a regular device (for example, a regular FET). Due to the inherent process variation in patterning (lithography/etch) for devices with CT at the borderline of the ground rule, the spacing between CT 125 and fin edge (for cuts at the borderline) may be greater or less than the critical WFM thickness for each transistor. The resulting PUF transistors in accordance with the example embodiments can include, based on the inherent process variation, a random distribution of PUF transistors with thinner WFM (e.g., that fails ground rule) resulting in Vt (threshold voltage) variation (Vt going up) and transistor performance degradation and PUF transistors with thicker WFM (e.g., that meets ground rule) resulting in more stable voltage and transistor performance.

Referring now to FIG. 2, a cross-sectional view 200 of a CT-fin that meets a logic ground-rule is shown. The FinFET 200 includes similar features as to that of FinFET 30, described with respect to FIG. 1 herein above. However, the distance of the CT 125 from the fin edge in this instance is greater than the minimal distance defined by the ground rule (for example, d>d0).

The transistor with CT-fin spacing greater than the critical WFM thickness (d>d0) 205 behaves the same as the regular FinFET, (logic "0") (as shown in FIG. 2). When reading the PUF on a device, the output of this FinFET 200 can be read (interpreted) as logic "0". In other words, in an instance in which CT-fin meets logic ground rule, the FinFET 200 behaves substantially the same as a regular FinFET, which indicates a logic "0".

Referring now to FIG. 3, a cross-sectional view 300 of a CT-fin that fails the logic ground-rule is shown. The FinFET 300 includes similar features as to that of FinFET 30, described with respect to FIG. 1 herein above. However, the distance of the CT 125 from the fin edge in this instance is less than the minimal distance defined by the ground rule (for example, d<d0).

The transistor with CT-fin spacing less than the critical WFM thickness (d<d0) 305 behaves differently from the regular FinFET, exhibiting higher Vt (threshold voltage) and lower drive current (logic "1") (as shown in FIG. 3). When reading the PUF on a device, the output of this FinFET 300 can be read (interpreted) as logic "1". In other words, in an instance in which CT-fin fails logic ground rule, the FinFET 300 has a higher Vt and lower current (when compared to a regular FinFET).

An array of such transistors (FIG. 2 and FIG. 3) with 'borderline' design produces a random and unique PUF for each chip. For example, each transistor in the array can represent a single bit with a value (logic "1" or logic "0") that is randomly determined based on process variation during patterning. The random distribution of bit values based on the borderline design creates a random identifier for each device that is difficult to counterfeit.

Figure 4:
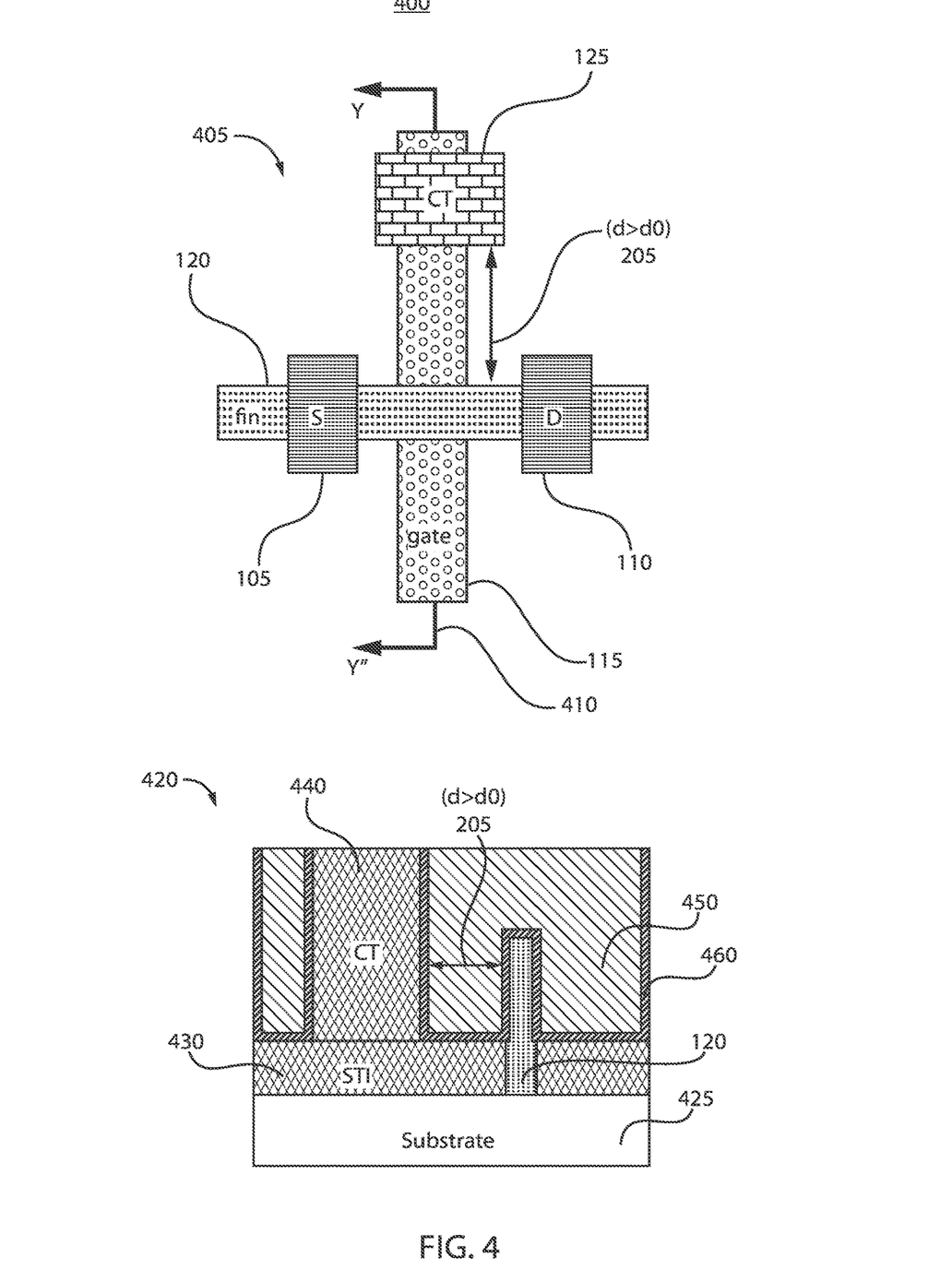
FIG. 4 is a cross-sectional view along a horizontal plane and corresponding cross-sectional view along a vertical plane of the CT-fin that meets the logic ground-rule, in accordance with an embodiment of the present invention.

Referring now to FIG. 4, a diagram 400 including a cross-sectional view 405 along a horizontal plane and corresponding cross-sectional view 420 along a vertical plane of the CT-fin that meets the logic ground-rule, is shown.

As shown in FIG. 4, cross-sectional view 420 is taken along the axis (fin cross-section Y to Y") 410 (from top view 405). The CT 125 in this instance produces a transistor in which:

Logic "0": CT-fin spacing (d) meets ground rule (d0), e.g., d>d0 (205) (for example, corresponding to FinFET 200, described with respect to FIG. 2, herein above). The CT-fins spacing in this instance exceeds the minimal distance determined by the ground rule.

As shown in the cross sectional view 420, the FinFET includes a substrate 425. A shallow trench isolation (STI) region 430 and a fin 120 is positioned on the substrate 425. A gate dielectric layer 460 is formed over the fin 120 and sidewalls of the CT 440. The fin 120 is enclosed in a work function metal layer 450 to the sides and over the top of the fins 120. A CT area 440 is formed through the work function metal layer 450. The distance, d>d0 (205), of the spacing between the fin 120 and the CT area 440 is greater than the critical WFM thickness.

The substrate 425 can include a semiconducting material, an insulating material, a conductive material or any combination including multilayers thereof. When the substrate 425 includes a semiconducting material, any semiconductor such as, for example, Si, SiGe, SiGe:C, SiC, Ge alloys, GaAs, InAs, InP and other III/V or II/VI compound semiconductors may be used. In addition to these listed types of semiconducting materials, the present disclosure also contemplates cases in which the semiconductor substrate is a layered semiconductor such as, for example, Si/SiGe, Si/SiC, silicon-on-insulators (SOIs) or silicon germanium-on-insulators (SGOIs). In some embodiments, the semiconducting material may include one or more semiconductor devices formed thereon.

When the substrate 425 is an insulating material, the insulating material can be an organic insulator, an inorganic insulator or a combination thereof including multilayers. When the substrate 425 is a conductive material, the substrate may include, for example, amorphous silicon, polycrystalline silicon, an elemental metal, alloys of elemental metals, a metal silicide, a metal nitride or combinations thereof including multilayers. When the substrate 425 includes a combination of an insulating material and a conductive material, the substrate may represent one of level which can be positioned beneath the electronic structure of the present disclosure.

The shallow trench isolation (STI) region 430 is formed from a dielectric material (e.g., silicon oxide) or a combination of multiple dielectric materials (e.g., silicon oxide and silicon nitride).

Gate dielectric layer 460 can include any suitable dielectric material, including but not limited to silicon oxide, silicon nitride, silicon oxynitride, high-k materials, or any combination of these materials. Examples of high-k materials include but are not limited to metal oxides such as hafnium oxide, hafnium silicon oxide, hafnium silicon oxynitride, lanthanum oxide, lanthanum aluminum oxide, zirconium oxide, zirconium silicon oxide, zirconium silicon oxynitride, tantalum oxide, titanium oxide, barium strontium titanium oxide, barium titanium oxide, strontium titanium oxide, yttrium oxide, aluminum oxide, lead scandium tantalum oxide, and lead zinc niobate. The high-k may further include dopants such as lanthanum, aluminum, magnesium. The gate dielectric material can be formed by any suitable process or any suitable combination of multiple processes, including but not limited to, thermal oxidation, chemical oxidation, thermal nitridation, plasma oxidation, plasma nitridation, atomic layer deposition (ALD), chemical vapor deposition (CVD), etc. In some embodiments, the gate dielectric has a thickness ranging from 1 nm to 5 nm, although less thickness and greater thickness are also conceived.

The work function metal (WFM) 450 sets the threshold voltage of the transistor. WFM can be any suitable material, including but not limited a nitride, including but not limited to titanium nitride (TiN), titanium aluminum nitride (TiAlN), hafnium nitride (HfN), hafnium silicon nitride (HfSiN), tantalum nitride (TaN), tantalum silicon nitride (TaSiN), tungsten nitride (WN), molybdenum nitride (MoN), niobium nitride (NbN); a carbide, including but not limited to titanium carbide (TiC) titanium aluminum carbide (TiAlC), tantalum carbide (TaC), hafnium carbide (HfC), and combinations thereof. The gate conductor and WFM can be formed by any suitable process or any suitable combination of multiple processes, including but not limited to, atomic layer deposition (ALD), chemical vapor deposition (CVD), physical vapor deposition (PVD), sputtering, plating, evaporation, ion beam deposition, electron beam deposition, laser assisted deposition, chemical solution deposition, etc. The critical WFM thickness is a minimum thickness for the device to perform as a regular device (for example, FinFET).

In some embodiments, an additional gate conductor (not shown) can be formed over WFM in some regions of the gate. The gate conductor can include any suitable conducting material, including but not limited to, doped polycrystalline or amorphous silicon, germanium, silicon germanium, a metal (e.g., tungsten (W), titanium (Ti), tantalum (Ta), ruthenium (Ru), hafnium (Hf), zirconium (Zr), cobalt (Co), nickel (Ni), copper (Cu), aluminum (Al), platinum (Pt), tin (Sn), silver (Ag), gold (Au), a conducting metallic compound material (e.g., tantalum nitride (TaN), titanium nitride (TiN), tantalum carbide (TaC), titanium carbide (TiC), titanium aluminum carbide (TiAlC), tungsten silicide (WSi), tungsten nitride (WN), ruthenium oxide ($RuO_2$), cobalt silicide (CoSi), nickel silicide (NiSi)), transition metal aluminides (e.g. $Ti_3Al$, ZrAl), TaC, TaMgC, carbon nanotube, conductive carbon, graphene, or any suitable combination of these materials. The conductive material may further include dopants that are incorporated during or after deposition.

The CT area 440 is formed of any dielectric material, including but not limited to silicon oxide (SiO), silicon nitride (SiN), silicon oxynitride (SiON), silicon carbide (SiC), silicon oxynitride (SiON), carbon-doped silicon oxide (SiOC), silicon-carbon-nitride (SiCN), boron nitride (BN), silicon boron nitride (SiBN), silicoboron carbonitride (SiBCN), silicon oxycabonitride (SiOCN), and combinations thereof. In some embodiments, the CT area 440 includes SiCO, SiCOH, and SiCH compounds; the above-mentioned silicon including materials with some or all of the Si replaced by Ge; carbon-doped oxides; inorganic oxides; inorganic polymers; hybrid polymers; organic polymers such as polyamides or SiLK™; other carbon-containing materials; organo-inorganic materials such as spin-on glasses and silsesquioxane-based materials; and diamond-like carbon (DLC, also known as amorphous hydrogenated carbon, α-C:H).

Figure 5:
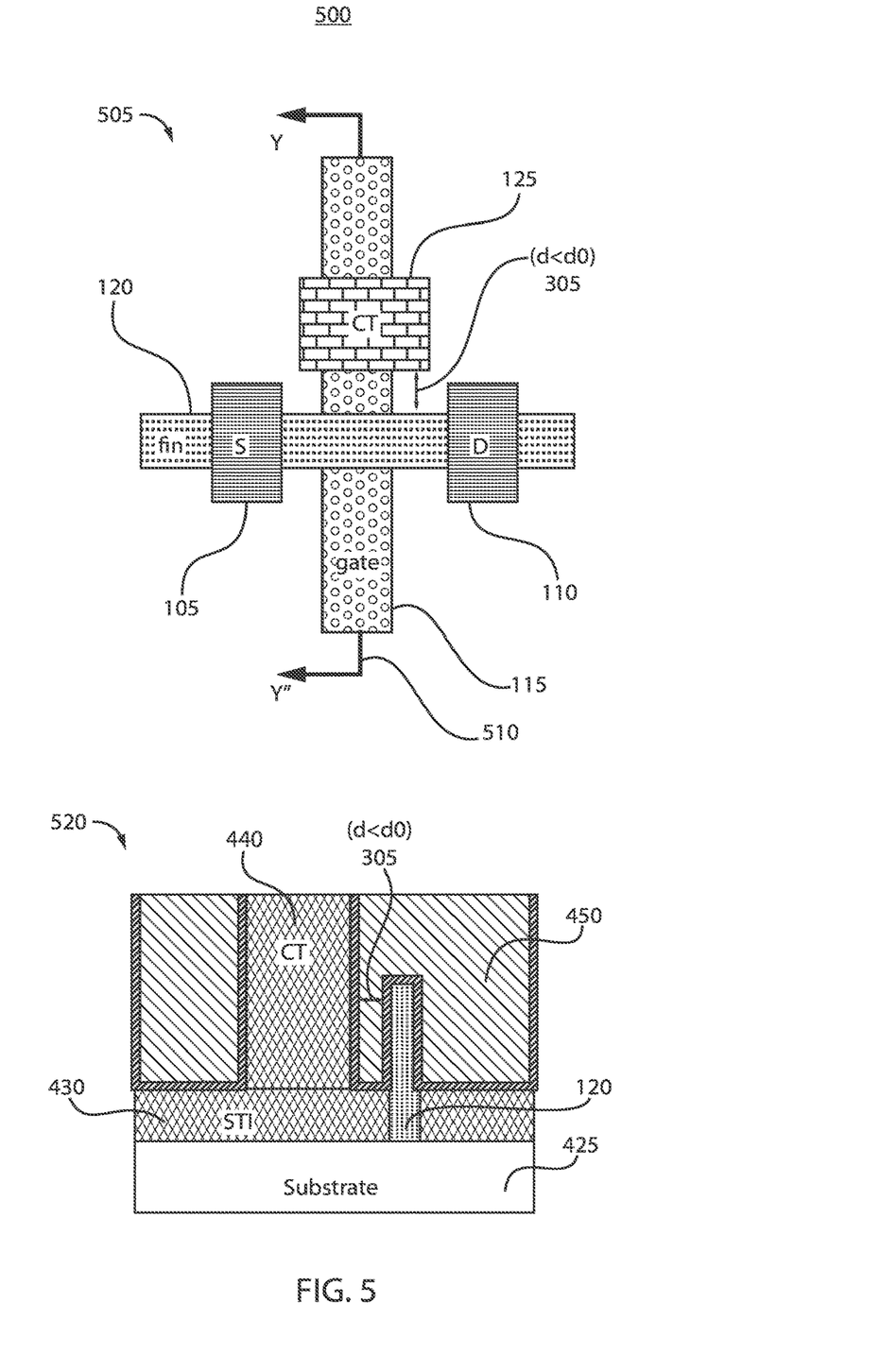
FIG. 5 is a cross-sectional view along a horizontal plane and corresponding cross-sectional view along a vertical plane of the CT-fin that fails the logic ground-rule, in accordance with an embodiment of the present invention.

Referring now to FIG. 5, a diagram 500 including a cross-sectional view 505 along a horizontal plane and corresponding cross-sectional view 520 along a vertical plane of the CT-fin that fails the logic ground-rule, is shown.

As shown in FIG. 5, cross-sectional view 520 is taken along the axis (fin cross-section Y to Y") 510 (from top view 505). The CT 125 in this instance produces a transistor in which:

Logic "1": CT-fin spacing fails ground rule, e.g., d<d0, (305), and in this instance there is not enough room to get full WFM thickness (for example, corresponding to FinFET 300, described with respect to FIG. 3, herein above). The CT-fins spacing in this instance is less than the minimal distance determined by the ground rule.

As shown in FIG. 5, the FinFET includes a substrate 425. A STI region 430 and a fin 120 is positioned on the substrate 425. A gate dielectric layer 460 is formed over the fin 120 and sidewalls of the CT 440. The fin 120 is enclosed in a work function metal layer 450 to the sides and over the top of the fins 120. A CT area 440 is formed through the work function metal layer 450. The distance, d<d0 (305), of the spacing between the fin 120 and the CT area 440 is less than the critical WFM thickness.

Figure 6:
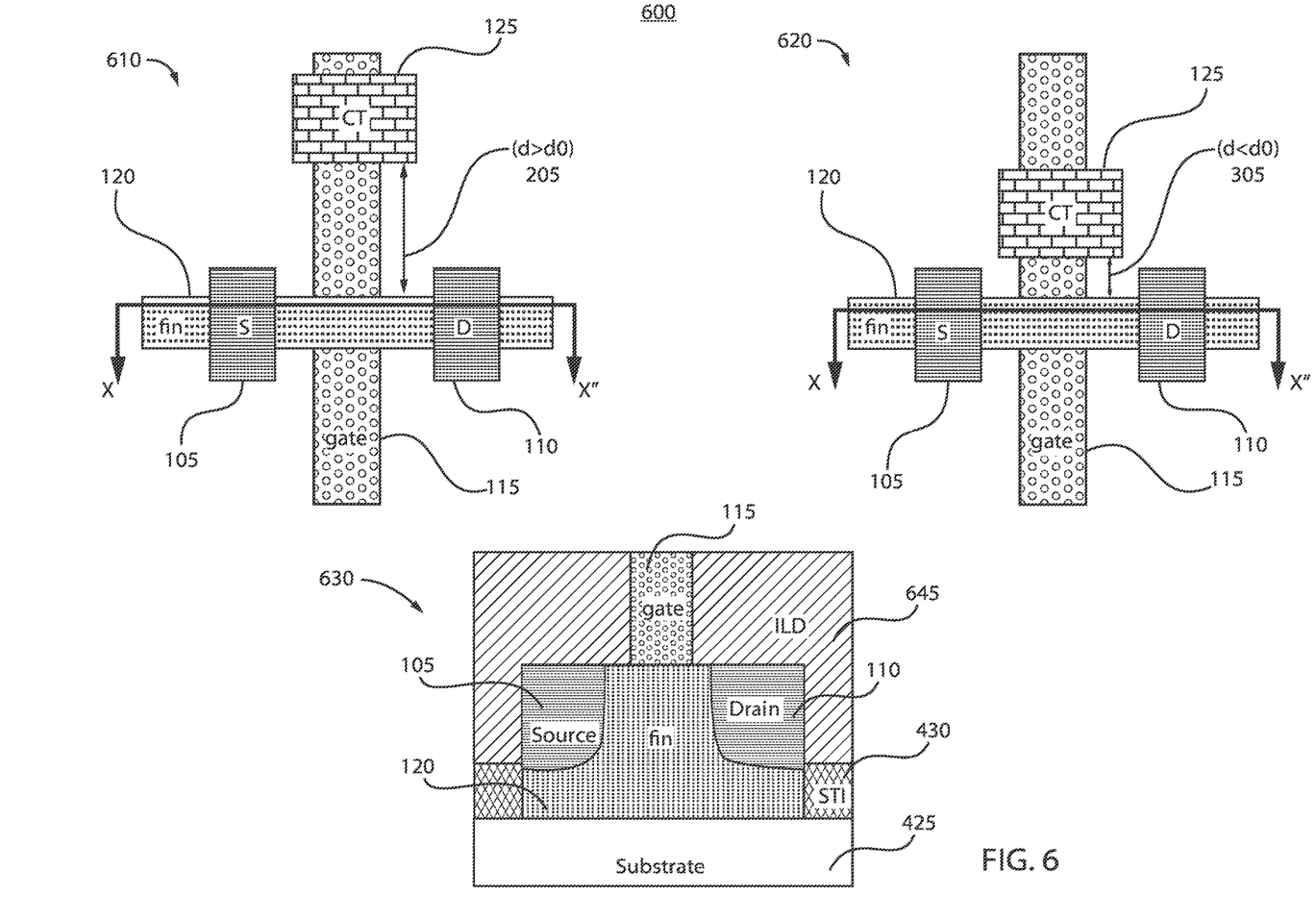
FIG. 6 illustrates cross-sectional views along a horizontal plane of a CT-fin that meets the logic ground-rule and CT-fin that fails the logic ground-rule and a cross-sectional view along a vertical plane of a gate in either instance, in accordance with an embodiment of the present invention.

Referring now to FIG. 6, a diagram 600 with cross-sectional views along a horizontal plane of a CT-fin that meets the logic ground-rule 610 and CT-fin that fails the logic ground-rule 620 and a cross-sectional view along a vertical plane of a gate 630 corresponding to either instance is shown.

As shown in top down view 610, a cross sectional view 630 of the gate 115 is taken along the axis (gate cross-section X to X") 615. The cross sectional view The CT 125 in this instance produces a transistor that corresponds to:

Logic "0": CT-fin spacing (d) meets ground rule (d0), e.g., d>d0 (205).

As shown in top down view 620, a cross sectional view 630 of the gate 115 is taken along the axis (gate cross-section X to X") 625. The CT 125 in this instance produces a transistor that corresponds to:

Logic "1": CT-fin spacing (d) fails ground rule (d0), e.g., d<d0.

X-X" cross-section 630 is the same for both logic "1" (top down view 620) and "0" (top down view 610).

As shown in the gate cross sectional view 630, the FinFET includes a substrate 425. The fin 120 is formed within STI region 430 on the substrate 425. The source 105 and drain 110 are formed on the fin 120. An interlevel dielectric (ILD) 645 is formed over the source 105 and drain 110 and to the sides of gate 115.

ILD 645 is formed from an interlevel dielectric material formed on source 105 and drain 110 region structures. The interlevel dielectric material may be selected from the group consisting of silicon-including materials such as $SiO_2$, SiN, $Si_3N_4$, SiOxNy, SiC, SiCO, SiCOH, and SiCH compounds; the above-mentioned silicon including materials with some or all of the Si replaced by Ge; carbon-doped oxides; inorganic oxides; inorganic polymers; hybrid polymers; organic polymers such as polyamides or SiLK™; other carbon-containing materials; organo-inorganic materials such as spin-on glasses and silsesquioxane-based materials; and diamond-like carbon (DLC, also known as amorphous hydrogenated carbon, α-C:H).

Figure 7:
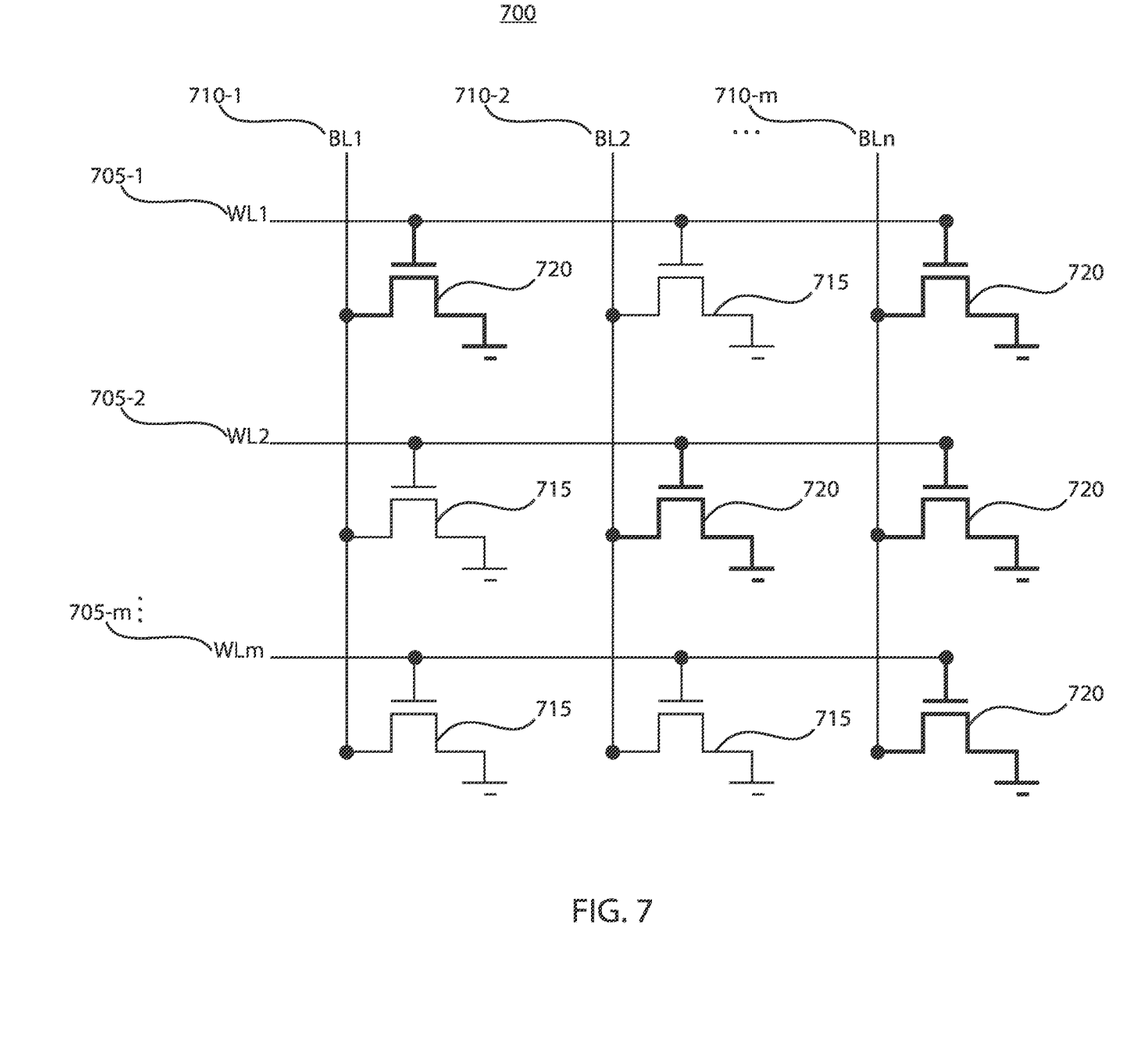
FIG. 7 is a diagram showing an array of fin field-effect transistors (FinFETs) forming multiple bit security code, in accordance with an embodiment of the present invention.

Referring now to FIG. 7, an array of fin field-effect transistors (FinFETs) forming a multiple bit security code is shown.

As shown, an array of FinFETs (715, representing smaller CT fin spacing (logic "1") and 720, representing larger CT fin spacing (logic "0")) can be implemented in a circuit to form a multiple-bit security code. The FinFETs 715 and 720 are connected to word lines (shown, by way of example, as WL1 (705-1) to WLm (705-m), where m is a variable greater than 1) and bit lines (shown, by way of example, as BL1 (710-1) to BLn (710-n), where n is a variable greater than 1) of the circuit 700. An M×N bits security code is generated on chip.

The array can be aligned on a PUF region of an integrated circuit chip that can include additional regions/devices. The security features can be determined by measuring drive current, in which CT-fin spacing equal to or greater than the critical thickness of results in low drive current (logic "0"), and WFM CT-fin spacing less than the critical thickness of WFM results in high on-current (logic "1"). By implementing the circuits in accordance with embodiments herein, there are no extra process costs for forming security circuits. Each of the FinFETs (715 and 720) can be implemented to represent bits in a security code. The FinFETs can be arranged in an array or other pattern or sequence that can be read to provide a security code. In instances in which the FinFETs are included on the chip, the values of each FinFET, and accordingly the collective value represented by the bits in total, will be randomly provided based on patterning variation at the borderline of the ground rule. In other words, in a provided array, none of the bits is predictable and therefore the device cannot be easily replicated.

In accordance with aspects of the present invention, random patterns of values of devices are defined with respect to an arbitrary boundary. The values of devices relative to the boundary provide a pattern or states which can be identified as a unique identifier or PUF. Some embodiments employ the states of materials in these devices to differentiate the device between compliant and non-compliant; however, additional states can also be employed.

Figure 8:
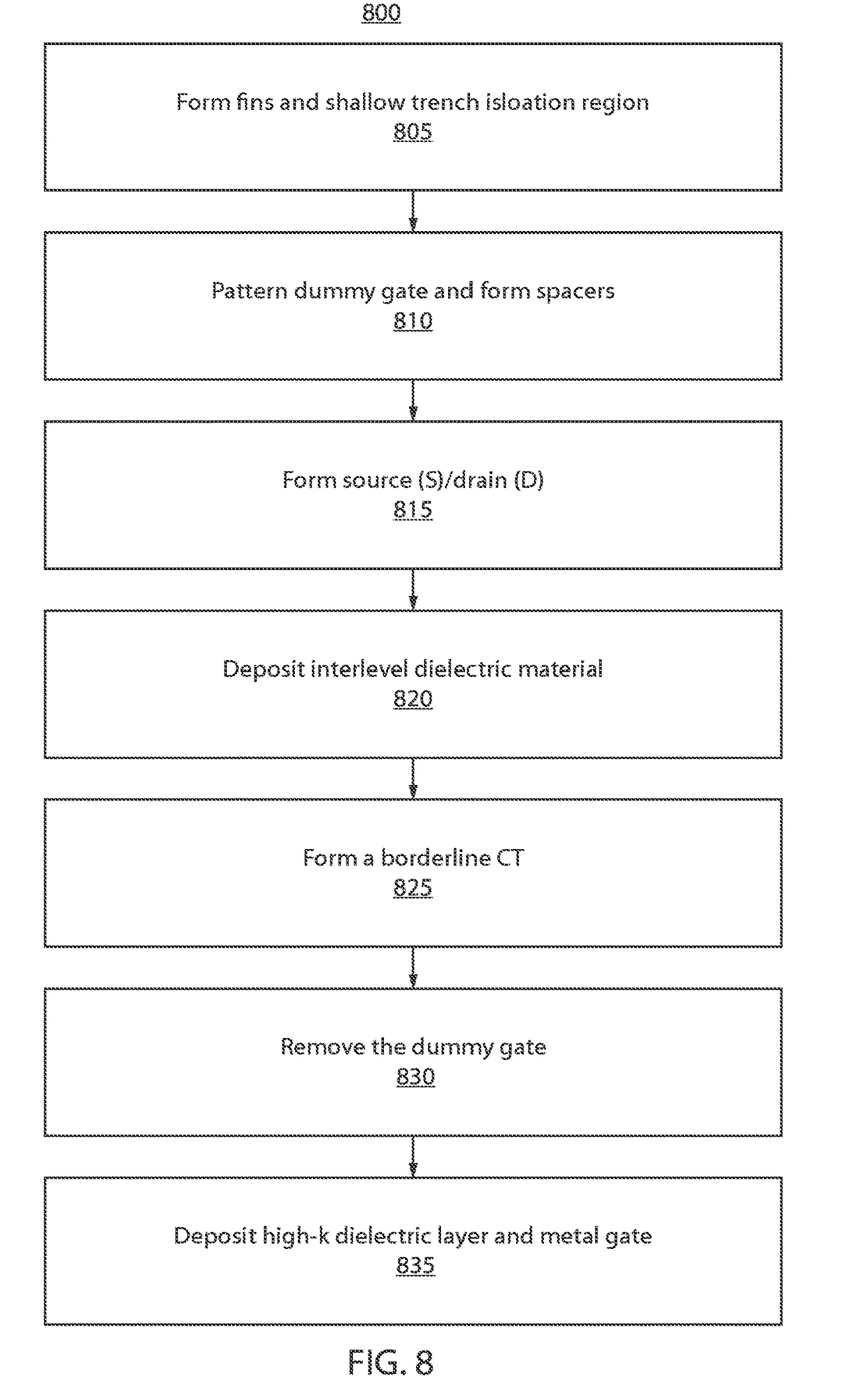
FIG. 8 is a flow diagram showing a method for manufacturing physical unclonable function (PUF) by variation of gate work function on fin channel sidewalls, in accordance with an embodiment of the present invention.

Referring now to FIG. 8, a flow diagram of a method for implementing chips with physical unclonable function (PUF) by variation of gate work function on fin channel sidewalls is shown.

The example embodiments of forming the PUF devices can be formed/implemented along with other devices by modifying a CT spacing (for example, CT-passing-fin spacing) in the layout of PUF devices. The process can produce a PUF region in which some FETs have WFM thickness between CT and fin less than a critical thickness whereas other FETs have WFM thickness greater than the critical thickness. Those FETs form a random and yet unique series of logic "1" and "0" states. Parts of the process flow can be implemented in a similar manner to a fin field effect transistor (FinFET) manufacturing flow.

At block 805, the process can include forming fins, and shallow trench isolation (STI) region 430. For example, a plurality of fin structures 120 may be formed from a semiconductor substrate, using any suitable patterning technique, for example lithography followed by etching. Other suitable techniques, such as sidewall image transfer (SIT), self-aligned double patterning (SADP), self-aligned quadruple patterning (SAQP), self-aligned multiple patterning (SAMP) can be used.

A shallow trench isolation (STI) region 430 (such as shown in FIGS. 4 and 6) can be formed. The STI regions 430 may be formed by etching a trench in the semiconductor substrate 425 using, for example, a dry etching process such as reactive ion etch (RIE) or plasma etching. The trenches are then filled with any suitable dielectric materials described above. The STI dielectric may optionally be densified after deposition.

At block 810, the process can include patterning a dummy gate and forming spacers. In replacement gate technology, a dummy gate structure (not shown), which is hereafter referred to as a sacrificial gate structure, is patterned first, followed by gate sidewall spacer formation. In some embodiments, the dummy gate include a dummy gate dielectric (e.g., silicon oxide) and a dummy gate placeholder (e.g., amorphous or polycrystalline silicon). Spacers (not shown) can be formed on dummy gate sidewalls at this point.

At block 815, the process can include forming source (S) 105/drain (D) 110. In some embodiments, epitaxy is performed to form S/D. The epitaxial material of the epitaxial source 105 and drain region structures 110 may be composed of a silicon-containing material. Epitaxial materials may be grown from gaseous or liquid precursors. Epitaxial materials may be grown using vapor-phase epitaxy (VPE), molecular-beam epitaxy (MBE), liquid-phase epitaxy (LPE), rapid thermal chemical vapor deposition (RTCVD), metalorganic chemical vapor deposition (MOCVD), ultra-high vacuum chemical vapor deposition (UHVCVD), low-pressure chemical vapor deposition (LPCVD), limited reaction processing CVD (LRPCVD), or other suitable process. Epitaxial silicon, silicon germanium (SiGe), germanium (Ge), and/or carbon doped silicon (Si:C) silicon can be doped during deposition (in-situ doped) by adding dopants, n-type dopants (e.g., phosphorus or arsenic) or p-type dopants (e.g., boron or gallium), depending on the type of transistor. The dopant concentration in the source/drain can range from $1\times10^{19}$ cm$^{-3}$ to $3\times10^{21}$ cm$^{-3}$, or in some instances between $2\times10^{20}$ cm$^{-3}$ to $3\times10^{21}$ cm$^{-3}$. Other doping techniques can be used to incorporate dopants in the bottom source/drain region. Dopant techniques include but are not limited to, ion implantation, gas phase doping, plasma doping, plasma immersion ion implantation, cluster doping, infusion doping, liquid phase doping, solid phase doping, in-situ epitaxy growth, or any suitable combination of those techniques.

At block 820, the process can include depositing interlevel dielectric material (for example, ILD 645, as shown in FIG. 6). The interlevel dielectric material may be deposited using at least one of spinning from solution, spraying from solution, chemical vapor deposition (CVD), PECVD, sputter deposition, reactive sputter deposition, ion-beam deposition, and evaporation. Following deposition of the interlevel dielectric material, a planarization processes is conducted so that the upper surface of the interlevel dielectric material is coplanar with the upper surface of the sacrificial gate cap. The planarization of the interlevel dielectric material may be provided by chemical mechanical planarization.

At block 825, the process can include forming a borderline CT for each of the non-planar devices. In the PUF region of the chip, a borderline CT mask can be applied that results in logic "0" or logic "1" for each of the devices, depending on whether CT-fin spacing is (for example, randomly) smaller or greater than the critical thickness of WFM. For example, the CT can be formed by placing the CT mask. The dummy gate not covered by CT mask is then removed to create CT trench. The CT trench is then filled with dielectric material(s) and planarization can then be applied.

At block 830, the process can include dummy gate removal. For example, the sacrificial gate structure may then be removed using an etch process. For example, the dummy gate may be removed by an etch chemistry that removes the material of the sacrificial gate cap, e.g., silicon nitride, selectively to the material of the underlying sacrificial gate structure, e.g., polysilicon. The etch process may also be selective to the interlevel dielectric material 645. In some embodiments, the sacrificial gate structure may be removed by an etch process that is selective to the interlevel dielectric material 645, the gate sidewall spacers and the fin structure 120. The etch process may include at least one of reactive ion etch, plasma etching and wet chemical etching. Thereafter, a functional gate structure is formed.

At block 835, the process can include high-k/metal gate deposition including WFM. High-k dielectric materials have a dielectric constant greater than silicon oxide (SiO$_2$) at room temperature, e.g., 25° C. For example, a high-k dielectric composed of hafnium oxide ($HfO_2$), may have a dielectric constant of 4.0 or greater. Due to the intentional borderline CT-fin spacing design in PUF region and the natural process variation, some FETs get WFM thinner than the critical WFM thickness to meet Vt requirement. As a result, those 'abnormal' FETs exhibit different characteristics than regular FETs.

The process can create physically unclonable electrical structures using sub ground rule gate cut mask placement to create varying current levels in a transistor structure. The process modulates the effective gate wrap around by modulating gate cut. The resulting structure can include an array of FinFETs as described with respect to FIG. 7 and preceding FIGS. These FinFETs can form a random and yet unique series of logic "1" and "0" states.

Logic "0": CT-fin spacing (d) meets ground rule (d0), i.e., d>d0.

Logic "1": CT-fin spacing fails ground rule, i.e., d<d0.

The processes described herein result in a PUF with 'borderline' CT passing fin design (CT-fin spacing). A semiconductor chip comprising a PUF region wherein some FETs having work function metal (WFM) thickness between gate cut (CT) and fin less than a critical thickness whereas other FETs having WFM thickness greater than the critical thickness.

In accordance with the example embodiments, the processes and structures determine a semiconductor chip comprising a PUF region wherein some FETs having WFM thickness between CT and fin less than a critical thickness whereas other FETs having WFM thickness greater than the critical thickness. The structures can be determined using conventional patterning. Structurally, the example embodiments provide an array of transistors.

Chip security can be an important tool for a variety of applications such as Internet-of-Things. The example embodiments provide a security feature on chip without adding process cost for virtually all electronics. The example embodiments can be formed using standard integrated circuit manufacturing methods and materials. The example embodiments can fabricate the PUF during standard integrated circuit manufacturing and can add a minimum number of additional process steps in order to complete the PUF structure.

Although FinFETs are used to illustrate embodiments of the invention, it should be understood that the methods, structure and principles described herein can be used for any transistors with a non-planar channel, including but not limited to, FinFET, nanowire transistors, nanosheet transistors, nano pillar transistors, etc.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A design for an integrated circuit chip in accordance with embodiments of the present invention may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Having described preferred embodiments of a system and method for implementing chips with physical unclonable function (PUF) by variation of gate work function on Fin channel sidewalls (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A semiconductor chip comprising:
   a substrate having a major surface;
   a physical unclonable function (PUF) region of the substrate that includes a plurality of devices, connected to one another in an M×N array, with read logic that measures drive current of the plurality of devices to generate a security code, and having a first work function metal (WFM) with random variations around a first thickness formed on a channel fin between the channel fin and a gate cut passing (CT) fin, such that a first subset of the plurality of devices has a WFM thickness below the first thickness and a second subset of the plurality of devices has a WFM thickness above the first thickness, with a PUF being defined in accordance with a random distribution of the first subset and the second subset; and
   an operational region that includes a plurality of operational FETs on the major surface, wherein all of the operational FETs have a second WFM with a greater thickness than the first thickness.

2. The semiconductor chip of claim 1, wherein the first subset of the plurality of devices and the second subset of the plurality of devices form a series of logic "1" and "0" states.

3. The semiconductor chip of claim 1, wherein each of the first subset of the plurality of devices includes CT-fin spacing less than the first thickness and behaves differently from an operational FET.

4. The semiconductor chip of claim 1, wherein each of the second subset of the plurality of devices includes CT-fin spacing greater than the first thickness and behaves as an operational FET.

5. The semiconductor chip of claim 1, wherein the first subset of the plurality of devices exhibits higher threshold voltage and lower drive current than the second subset of the plurality of devices.

6. The semiconductor chip of claim 2, wherein the plurality of devices form a multiple-bit security code.

7. The semiconductor chip of claim 1, wherein the first subset of the plurality of devices have varying voltage thresholds and the second subset of the plurality of devices have a consistent voltage threshold.

8. An array of transistors comprising:
   a substrate having a major surface;
   a plurality of transistors connected to one another in an M×N array, with read logic that measures drive current of the plurality of devices to generate a security code, having a first work function metal (WFM) with a first thickness with random variations such that one or more first FETs that have a WFM thickness less than a first thickness and one or more second FETs that have a WFM thickness that exceeds the first thickness, wherein a physical unclonable function (PUF) region is defined in accordance with the random distribution; and
   a plurality of operational FETs on the major surface, having a second WFM, wherein all of the operational FETs have a second WFM with a greater thickness than the first thickness.

9. The array of transistors of claim 8, wherein the one or more first FETs and the one or more second FETs form a series of logic "1" and "0" states.

10. The array of transistors of claim 8, wherein each of the one or more first FETs include CT-fin spacing greater than the first thickness and behaves as an operational FET.

11. The array of transistors of claim 8, wherein each of the one or more first FETs include CT-fin spacing less than the first thickness and behaves differently from an operational FET.

12. The array of transistors of claim 8, wherein the one or more first FETs exhibit higher threshold voltage and lower drive current than the one or more second FETs.

13. The semiconductor chip of claim 1, wherein the first thickness is at the critical thickness.

14. The semiconductor chip of claim 1, wherein the plurality of devices in the PUF region have spacings between respective channel fins and respective CT fins that varies such that the first subset of the plurality of devices has a spacing that is less than the first thickness and such that the second subset of the plurality of devices has a spacing that is greater than the first thickness.

15. The semiconductor chip of claim 14, wherein the at least one operational FET of the operational region has a spacing between a channel fin and a CT fin that is greater than the first thickness.

\* \* \* \* \*